United States Patent
Fiedrich

[11] Patent Number: 6,152,377
[45] Date of Patent: Nov. 28, 2000

[54] RADIANT FLOOR AND WALL HYDRONIC HEATING SYSTEM TUBING ATTACHMENT TO RADIANT PLATE

[76] Inventor: Joachim Fiedrich, 20 Red Pine Dr., Carlisle, Mass. 01741

[21] Appl. No.: 08/500,069

[22] Filed: Jul. 10, 1995

Related U.S. Application Data

[63] Continuation-in-part of application No. 08/207,950, Mar. 8, 1994, Pat. No. 5,579,996, which is a continuation of application No. 07/906,800, Jun. 30, 1992, Pat. No. 5,292,065.

[51] Int. Cl.$^7$ ..................................................... F24D 5/10
[52] U.S. Cl. .............................................. 237/69; 165/49
[58] Field of Search ................................. 237/69; 165/49, 165/56

[56] References Cited

U.S. PATENT DOCUMENTS

| | | | |
|---|---|---|---|
| 5,014,777 | 5/1991 | Sano | 165/185 |
| 5,292,065 | 3/1994 | Fiedrich | 237/69 |

FOREIGN PATENT DOCUMENTS

| | | | |
|---|---|---|---|
| 2850669 | 5/1979 | Germany | 165/49 |
| 2747952 | 6/1979 | Germany | 165/49 |
| 41443 | 3/1977 | Japan | 165/49 |
| 49641 | 4/1980 | Japan | 165/49 |
| 56715 | 3/1987 | Japan | 237/69 |
| 2124358 | 2/1984 | United Kingdom | 165/56 |

*Primary Examiner*—William E. Tapolcai
*Attorney, Agent, or Firm*—Robert T Dunn, Esq.

[57] ABSTRACT

A hydronic heating system having a source of hot supply water and a reservoir of cooler return water and one or more heating loops that include a heating element that is a length of tubing that conducts water from the supply to the return and the length of tubing is mounted in a wall or a floor of an area heated by the system by RFH or RWH, respectively, in a room includes: a highly thermally conductive plate having a radiating surface mounted in the area floor or wall, adjacent a surface thereof; a plate support of relatively low thermal conductivity material providing an elongated space for holding the length of tubing adjacent the plate; the elongated space being defined by two parallel sides provided by the plate support, a third elongated side provided by the plate and an elongated open side; the side provided by the plate being substantially wider than the open side; the tubing is inserted into the space through the open side thereof; and a compliant filler of relatively higher thermal conductivity material fills around the tubing between the tubing and the plate throughout the space against the side thereof provided by the plate; whereby the plate is heated by conduction of heat from the tubing through the filler material in the space against the side thereof provided by the plate; and the plate radiating surface radiates heat to the area.

23 Claims, 6 Drawing Sheets

RADIANT FLOOR AND WALL HYDRONIC HEATING SYSTEM TUBING ATTACHMENT TO RADIANT PLATE

This application is a Continuation-In-Part of my application Ser. No. 08/207,950, filed Mar. 8, 1994, entitled "Radiant Floor And Wall Hydronic Heating Systems", now U.S. Pat. No. 5,579,996, which is a Continuation of my application Ser. No. 07/906,800, filed Jun. 30, 1992, issued Mar. 8, 1994, U.S. Pat. No. 5,292,065, entitled "Radiant Floor And Wall Hydronic Heating Systems" (patent (065)).

BACKGROUND OF THE INVENTION

The present invention relates to hydronic heating systems for dwellings, offices, etc. and more particularly to such hydronic heating systems having heating loops that consist of tubing or pipes attached to modular radiating panels in the floor or walls of a room that heat the room by radiation and method and means of securing the tubing to the panels.

Radiant Floor And Wall Hydronic Heating

Radiant floor heating (RFH) and radiant wall heating (RWH) are techniques of heating rooms in a dwelling or commercial building for human and creature comfort. It is believed by many that radiant heating is the ideal way to warm the human body. Europeans have revitalized a modern form of hydronic radiant floor heating in the last few decades after it had been out of use since the Romans first used warm air floor heating systems in their villas two thousand years ago.

Radiant heating warms the surfaces of a room: the floor, the walls, the furniture, which become heat sinks, slowly giving off their warmth to the cooler surroundings. People and creatures in the room then absorb this heat as needed. It can be compared to walking barefoot on warm earth that has been heated by the rays of the sun when surrounding air temperature is cool, however, as long as there is no breeze, one feels comfortably warm. Furthermore, in a radiant heating system, the warm temperatures are kept at floor level and radiate up wards; and, since there is no circulating air, there is not a hot pocket of air formed at the ceiling level. With radiant floor heating, one actually experiences cooler temperatures at head level and warmer temperatures at foot level which results in comfort and warmth.

In most western European countries, especially Germany and Scandinavia, hydronic radiant heating is the most popular technique of heating, not only residential dwellings, but also commercial buildings.

Heating comfort is not the only advantage of hydronic radiant floor heating and these other advantages help to make the choice even more sensible. Some of the other advantages of hydronic RFH and RWH are:

1. Reduced heat loss of 20% to 50%, depending on the application;
2. Suitable for all types of hydronic heat sources from high temperature boilers to low temperature heat pumps and solar water heaters, since most of these systems will operate at loop supply water temperatures of 120° F. or less;
3. Ideal for hard to heat areas, especially high and voluminous spaces and large glassed-in living areas;
4. No air movement within the building is caused by the system and so there are no recessed areas where dirt and dust can be trapped, thereby eliminating some dust and allergy problems;
5. No visible radiation units, thereby eliminating the need to work around heating elements, and so wall space is not limited by heating elements; and
6. Completely quiet and free of circulation and expansion and contraction noises, making the system noiseless.

In the past, tubing materials, control devices and proper installation techniques had not been perfected and so radiant heating was not used. However, the present reliability of controls, special installation techniques, and, particularly the development of very strong flexible plastic tubing, called PEX tubing, with its two decade record of successful installations embedded in cement floors, eliminates many causes for concern.

A heating loop may include several heating elements like wall mounted radiators and/or baseboard finned tubing that are the principal heat exchangers of the loop, or the tubing itself may be the principal heat exchanger of the loop. In the latter case the tubing is usually buried in a layer of concrete that forms the floor of a room and so the tubing heats the concrete slab, which is the floor. The concrete that the tubing is buried in is a special kind for the purpose and the heat exchange is principally by conduction and radiation to the concrete, which in turn heats the room by some conduction and convection, but principally by radiation. Hence, this type of heating is called Radiant Floor Heating (RFH). Similarly, the tubing is sometimes mounted in a wall embedded in a layer of concrete and this is called Radiant Wall Heating (RWH).

Plastic Tubing Heating Loops

In such RFH and RWA systems and other hydronic heating systems using wall radiators and/or baseboard finned tubing elements, the supply water temperature from the boiler must be controlled so that it does not exceed certain limits that are substantially lower than the usual boiler supply water temperature. There are several reasons for this: the floor or wall must not be uncomfortable hot; and where the tubing is plastic, the water temperature for some plastic materials must not exceed about 140° F., although good quality "cross-linked" polyethylene tubing can carry water at temperature in excess of 140° F. without any deterioration of the tubing or the tubing oxygen barrier.

The design criteria of plastic tubing for RFH and RWH system applications is determined by a number of important factors to insure an absolutely safe and reliable tubing. The most important design criteria requirements are:

1. High resistance to temperature aging for water temperatures up to 200° F.
2. High resistance to stress cracking.
3. High resistance to chemical solvents (water additives, antifreeze solutions, concrete additives).
4. Lowest possible linear thermal expansion.
5. High tensile strength.
6. High form stability.
7. High resistance to abrasion.
8. High resistance to deformation.
9. Dimensional tube tolerances.
9. Internal and external tube wall smoothness.
10. Behavior during long term internal pressure creep test which takes into account the temperature-dependent aging behavior of the pipe material at water temperatures up to 200° F.

Many of these requirements are dictated by the usual practice of embedding the tubing in a layer of concrete. They are design criteria that are outlined and specified in the ASTM standards (American Society for Testing and Materials), and DIN (German Industry Standards). Many, if not all of these design requirements be achieved while still retaining a flexible and workable plastic tubing (pipe) as an end product. That tubing is called PEX, which is short for "Polyethylene Cross-Linked". PEX has been synonymous with plastic heating pipe in many European countries for several decades and has a track record that has made it the plastic tubing of choice for hydronic heating applications. Long term bench tests, which simulate 30 years of continuous use, in addition to accelerated testing which projects pipe performance well in excess of 30 years has confirmed the excellent long term real service life track record of PEX. Crossed-linked polyethylene tubing is now, after 20 years of use and improvements, the most widely accepted pipe material in the European plumbing industry for both heating and plumbing applications.

Plastic Tubing and Cross-Linking

The molecules of any plastic material tend to slip and slide over one another fairly freely. As ambient and water temperatures rise, the plastic material softens and finally melts. This thermal oxidation of plastic material is a long term aging process which will eventually result in pipe failure.

To combat this premature aging the molecules within the tubing are realigned in order to give greater stability to the material itself. The cross-linking process takes place within the molecular structure of the plastic material. The most common thermoplastic materials currently being used for heating and plumbing pipe, often referred to as polyolefin materials are: Polyethylene (PE); Polypropylene (PP); and Polybuten (PB) (generic term for polybutylene). Among this family of polyolefin plastics, only Polyethylene has been determined to have the molecular structure which lends itself perfectly to the cross-linking process.

"Un-cross-linked" polyethylene tubing, as it leaves the extruder where it receives its basic pipe dimension and wall thickness, is composed of long hydro-carbon string molecules forming a loosely held together array of hydrogen and carbon atoms which can be compared to a beaded curtain swaying in a breeze. This is basically the molecular composition of the polyethylene tubing which is available at any hardware store and is suitable only for non-critical applications such as draining condensation from an air conditioning unit. A material, in this form, is unsuitable for heating and plumbing applications. Within a relatively short period of time the pipe material fatigues under the stress of water temperature and pressure as well as temperature cycling and the beaded curtain splits open without resistance. By cross-linking those beads (hydro-carbon string molecules), forming cross-connections which are referred to as cross-linking bridges, the string molecules form a three dimensional network of hydro-carbon molecules. The beaded curtain becomes transformed into a fishing net with strength and stability.

The previously non-applicable polyethylene pipe has been trans formed, after cross-linking, into a completely different material with all the desired characteristics we demand for a heating or plumbing pipe. After the cross-linking of the PE tubing, its molecular mobility is severely impeded by the cross-linking bridges between the string molecules. The material does not flow or melt and its form becomes stable against heat. The material holds its shape at all temperatures, even exposed to blow torch temperatures until it chars or burns. The thermoplastic has been transformed into a thermoset material by cross-linking, eliminating the melting point or liquid phase of the material.

Low Temperature vs High Temperature Operation

The hydronic heating loop supply water temperature could be maintained low and so avoid the problem of tubing aging, by simply operating the boiler at a lower water temperature. However, that can cause flue gas condensation on the boiler water heat exchanger. For example, the flue gas due point can be as high as 140 F. and so to avoid flue gas condensation it is preferred that the boiler supply water temperature be not less than 140° F.

In hydronic heating systems subject to such water temperature limitations, where the boiler is powered by burning fossil fuels, the boiler water supply temperature is usually well above 140° F. and often at about 190° F. to 200° F., and so the boiler supply temperature must be stepped down before it is fed to the heating loops.

A suitable system for reducing and controlling the supply water temperature is described in my U.S. Pat. No. 5,119,988, issued Jun. 9, 1992, entitled "Hydronic Heating Water Temperature Control System. In that patent, a three-way, modulated diverting or by-pass valve is provided in the return line to the boiler, between the heating loop return header and the boiler return. The diverting valve has one input and two outputs. The input is from the heating loops return header, the first output is to the boiler return line and the second output is to the boiler supply line. The diverting valve diverts some of the cooler return water to the hot supply water to reduce the temperature of the supply water feeding the heating loop supply header. Thus, the supply water is diluted with return water, lowering the temperature of the supply water directly from the boiler. The diverting valve is a modulated valve and the temperature of the supply water flowing to the supply header is detected and used as a feedback control signal to modulate the valve.

Dry Installation Of RPH And RWH

Installation of the PEX tubing embedded in concrete requires special skills and tools and is relatively expensive. Also there must be suitable support structure as the concrete adds considerable weight. This technique of installing the tubing in wet concrete or cement is sometimes called a "wet" installation and requires special equipment and working skills to hold the tubing in place, and in the case of RFH, pour the wet concrete to cover the tubing by an inch or more and finish the concrete surface when it sets. For a wall installation, special skills are required to spread to spread a special wet cement or plaster mix over the tubing that has been attached to the wall and then finish the wall, usually with a wet white plaster mix. These "wet" installations depend upon the direct conduction of heat from the tubing into the concrete or plaster, raising the temperature of the concrete or plaster, which in turn radiates heat into the room. The thermal mass of the cured cement, concrete or plaster in these installations makes the response time of the hydronic heating system slow.

The PEX oxygen barrier tubing, or its equivalent, is required for these wet installations to insure that the PEX tubing will not fail within the life expectancy of the building it is installed in. Inferior quality tubing fatigues under the stress of the water temperature (even water at 110° F.) and pressure and splits, like uncross-linked polyethylene tubing and without a suitable oxygen barrier, oxygen diffusion occurs and the system components that contain the water corrode.

Techniques of providing hydronic RFH and RWH without embedding the loop tubing in concrete, cement or plaster, or the like, in new construction and in old construction are described in my above mentioned patent (065} and my co-pending parent application (950). As described therein, the loop tubing is mounted in modular pieces (modular units) that each provide an elongated space for holding the tubing against the radiating plate thereof and a compliant, relatively thermally conductive filler material (such as silicone rubber) adheres the tubing to the plate. The compliant quality of the silicone rubber allows the tubing to move slightly longitudinally in the elongated space with respect to the plate and the holder, as necessary to accommodate differences in thermal expansion and the thermal conductivity of the filler material provides a ready thermal path from the tubing to the plate.

The present invention is an improvement to the structures and methods of using the compliant filler that are described in my patent (065) and application (950).

SUMMARY OF THE INVENTION

It is an object of the present invention to provide an improvement to the structures and methods of using the compliant filler that are described in my patent (065) and application (950).

It is another object of the present invention to provide a hydronic heating system in a building wherein the system heating elements include tubing and radiating plates in the floor and/or the walls of the building in a "dry" installation, the tubing being inserted into an elongated tube holding space adjacent the plate and adhered thereto by a compliant thermally conductive filler material in the holding space, with improved thermal connect from the tube to the plate.

It is another object to provide such a system for which installation of the RFH tubing heating elements is on top of the rough flooring of a room.

It is another object to provide such a system for which installation of the RFH tubing heating elements is below the rough flooring of a room.

It is another object to provide such a system for which installation of the RWR tubing heating elements is over the studs of a wall in a room.

It is another object to provide such a system for which installation of the RWH tubing heating elements is between the studs of a wall in a room.

It is another object to provide such a system for which thermal conduction and radiation from the RFH or RWH tubing heating elements is increased substantially by radiating surfaces in direct thermal contact with the tubing, and forming part of the installation.

Embodiments of the present invention have application to a hydronic heating system that has a boiler supplying hot supply water, a reservoir of cooler return water, a supply water line, a return water line and one or more heating loops through which water flows from the supply line to the return line. The heating loop includes a heating element that is the length of tubing that conducts water from the supply to the return and is mounted in a wall or a floor of an area heated by the system by RFH or RWH in intimate thermal connection to a thermally conductive radiating plate in a tube holding space that is adjacent or part of the plate; and means including a compliant, thermally conductive filler material for adhering the tubing to the plate, so that the plate is heated by conduction of heat from the tubing and the plate has a radiating surface that radiates heat to the area.

In the embodiments described herein, the plate is between the tubing and the floor or wall surface and is held against the plate by holding pieces (wood sleepers) that hold the plate against the floor or wall and also hold the tubing against and longitudinally along the plate and in intimate thermal contact therewith by the compliant thermally conductive filler material. The wood sleepers define the elongated tube holding space adjacent the plate and are undercut and the undercuts are filled with the compliant thermally conductive filler material to provide greater thermal contact between the tubing and the plate. In other words, the "thermal footprint" of the tubing on the plate is increased by the undercuts filled with the relatively thermally conductive filler material.

In preferred embodiments, the plate and the holding pieces (wood sleepers) are assembled to form a modular piece or modular unit; and several such modular pieces are arranges in line attached to the sub-floor for RFH, or the wall studs for RWH, with filler material in the elongated space and the undercuts, ready for insertion of the tubing into the space, forcing the filler material into the undercut spaces and so providing a larger thermal footprint of the tubing against the plate. Following such insertion, into modular pieces aligned: for RFH on top of the sub-floor, the installation is ready for a finished floor covering; where the installation is under the sub-floor for RFH the finished floor covering does not have to be disturbed, but insulation (such as fiberglass) should cover it between the floor joists; and on the wall studs for RWH, the installation is ready for a finished wall covering. In all these cases, RFH or RWH is installed "dry" (without wet concrete, cement or plaster) and the installation can be accessed later by simply removing the finished cover or insulation.

DESCRIPTION OF EMBODIMENTS OF THE INVENTION

RFH—Tubing Under The Sub-Floor

Figure 1:
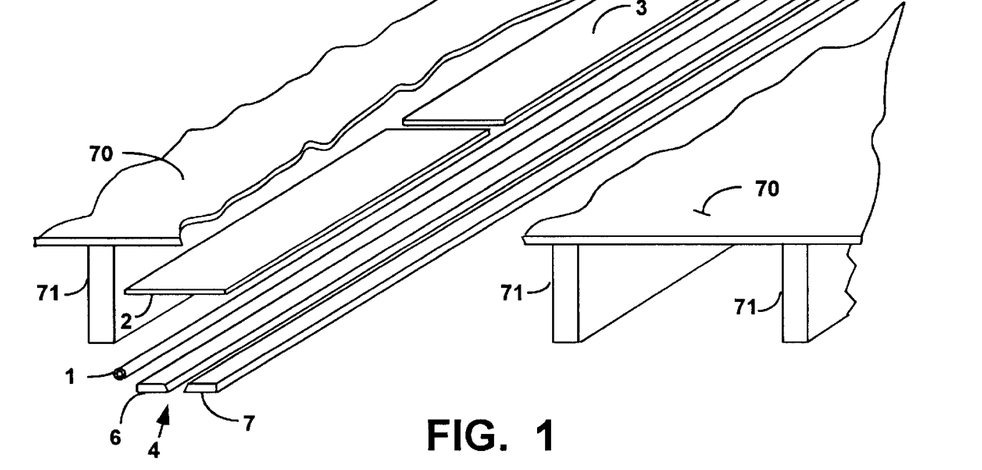
FIG. 1 is a diagram of an RFH installation showing an under sub-floor installation in an exploded view revealing the tubing, heat conduction and radiation plates and holding pieces (wood strapping) that holds the assembly of tubing and radiation plates against the under side of the sub-floor that is on top of the floor joists of a room in a typical wood frame building according to my above mentioned patent (065) and application (950)

FIG. 1 is a diagram of an RFH installation showing the background of the present invention in an exploded view. The hydronic heating system tubing 1 is part of a heating loop of the system and, in particular, part of an RFH heating loop of the system. The hydronic heating system (not shown) preferably has supply water temperature control, such as described in my U.S. Pat. No. 5,119,988, issued Jun. 9, 1992 (patent (988)). The tubing is held against several lengths of heat conducting and radiating plates, such as 2 and 3. It is held between holding pieces 6 and 7, herein called sleepers, that may be wood, plywood or wood particle board, so that the entire length of the tubing intended to give off heat to the floor is in intimate thermal contact with the plates, end to end, along the length of the tubing and is adhered to the plates further by a compliant thermally conductive filler material as described fully in my patent (065) and application (950).

Figure 2:
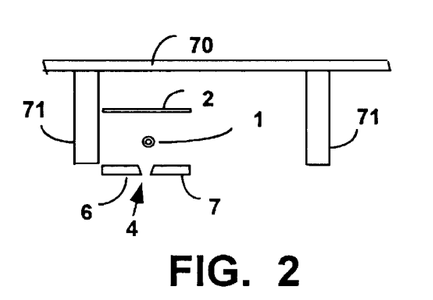
FIG. 2 is an end view of the parts shown in FIG. 1 and is also an exploded view of the parts.
Figure 3:
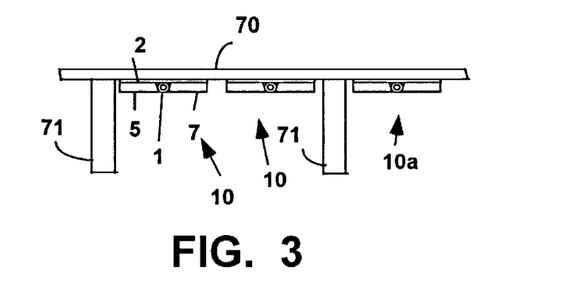
FIG. 3 is an end view of the parts shown in FIG. 1 showing the parts installed under the sub-floor.

To mount the assembly of plates, holding pieces (sleepers) and tubing to the underside of the sub-floor, as shown in FIGS. 2 and 3, the tubing is held against the plates, which are held firmly against the underside of the sub-floor 70 of a room, the sub-flooring being supported by floor joists, such as floor joist 71. The plates 2 and 3 may be stapled, nailed or otherwise firmly attached to the underside of the sub-floor. Then the tubing is mounted against the plates so that the tubing and the plates are in intimate thermal contact. This is done as described herein using a compliant thermally conductive filler material 20, which may be a particular thermally conductive caulking or epoxy as described with reference to FIGS. 6 to 10. Holding pieces 6 and 7 hold the plate against the underside of the sub-floor and the tubing is sandwiched between the holding pieces in space 4. The entire assembly 10 of tubing 1, filler material 20, plates 2 and 3 and wood holding pieces 6 and 7 are stapled or nailed through the wood pieces to the bottom of the sub-floor.

Tube Holding Modular Pieces

Figure 4:
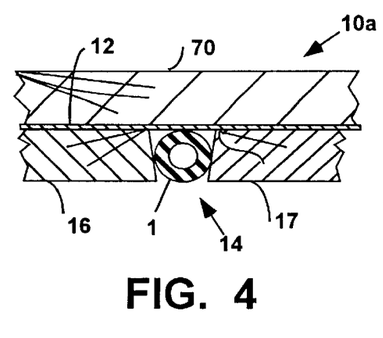
FIG. 4 is a further enlarged end view showing the assembly heat transfer plate and holders with tubing inserted and adhered thereto with compliant thermally conductive filler material.
Figure 5:
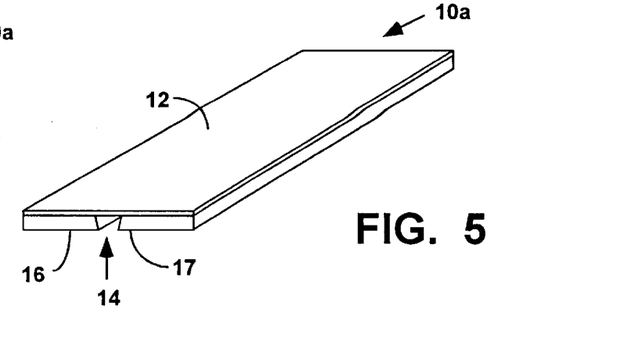
FIG. 5 is a perspective view of the assembly of heat transfer plate and holder providing a modular piece or modular piece (unit), according to my patent (065) and application (950)

A configurations of a module piece, which is an assembly of a heating plate, like plates 2 and 3, and tube holding pieces that serve the functions of the wood pieces 6 and 7 in FIGS. 1 to 3, is shown in FIGS. 4 and 5. This configuration is also described in my patent (065) and application (950). A typical modular piece, denoted 10a, is shown in FIG. 5. It is composed of two lengths 16 and 17 of plywood, particle board or other rigid material that is not thermally conductive and is the same thickness as the outside diameter of the tubing that it holds. The two lengths 16 and 17 of wood holder pieces (herein also called sleepers) hold the heat conduction and radiation plate 12 against the underside of sub-flooring 70 and provide a tubing containment space 14, the length thereof for holding the tubing 1 against the plate.

As shown in FIG. 4, the tubing containment space 14 is the space between sleeper pieces 16 and 17 and is closed on one side (the top side in this Figure) by the plate 12 and so the tubing must be inserted into this space from the other side of the space (the bottom in this Figure). Thus, the open end of the tubing containment space 14 is separated from the sub-floor by the plate, whether mounting is to the underside of the sub-floor, as shown in FIGS. 1 to 4, or to the top side of the sub-floor in essentially the manner shown and described herein with reference to FIGS. 11 and 12.

The plate is made of highly thermally conductive material such as aluminum, copper or steel. For example, it can be made of a relatively thin sheet of 0.008 gage, 3003 alloy aluminum; and is attached to sleepers 16 and 17 by a suitable glue or epoxy. Plate 12 can also be made of heavier thermally conductive material so that it conducts heat from the tubing more readily.

For installations in wood frame construction where the spacing between floor joists and between wall studs is 16 inches on center, the modular piece size is made in consideration of that usual joist and stud spacing. For example, for the under floor installation shown in FIGS. 1 to 4, two modular pieces must fit side by side in a bay between floor joists and the bay width is about 14½ inches. Therefore, the preferred width of the module piece is less than half of that, or between 6 and 7 inches. The length of the modular piece is preferably a whole multiple of 16 inches and preferably 32 or 48 inches.

Holder Pieces With Undercut For Greater Thermal Footprint

Figure 6:
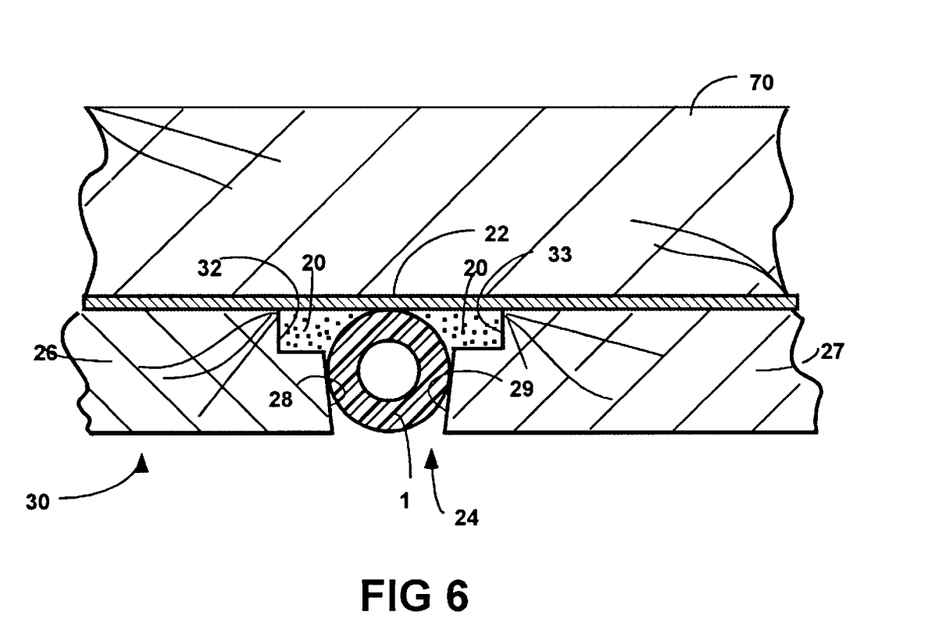
FIG. 6 is a much enlarged end view of the modular piece as installed against the under side of the sub-floor, showing the heat radiating plate and holder assembled with the tubing and the compliant thermally conductive filler material adhering the tubing against the plate in intimate thermal contact therewith over a broad area of the plate, provided by undercuts in the holder adjacent the plate, increasing the thermally conductive contact area of the tubing with the plate, according to the present invention.

FIG. 6 shows an embodiment of the modular piece 30 according to the present invention, oriented for under the sub-floor 70 installation similar to the installation shown in FIG. 4. In FIG. 6, the tubing containment space 24 of modular piece 30 is the space between sleeper pieces 26 and 27 and is closed on one side (the top side in FIG. 6) by the plate 22 and so the tubing 1 must be inserted into this space from the other side of the space (the bottom side in FIG. 6.) The filler material 20 adheres the inserted tubing 1 against the plate 22 over a broad area thereof provided by the undercuts 32 and 33.

Figure 7:
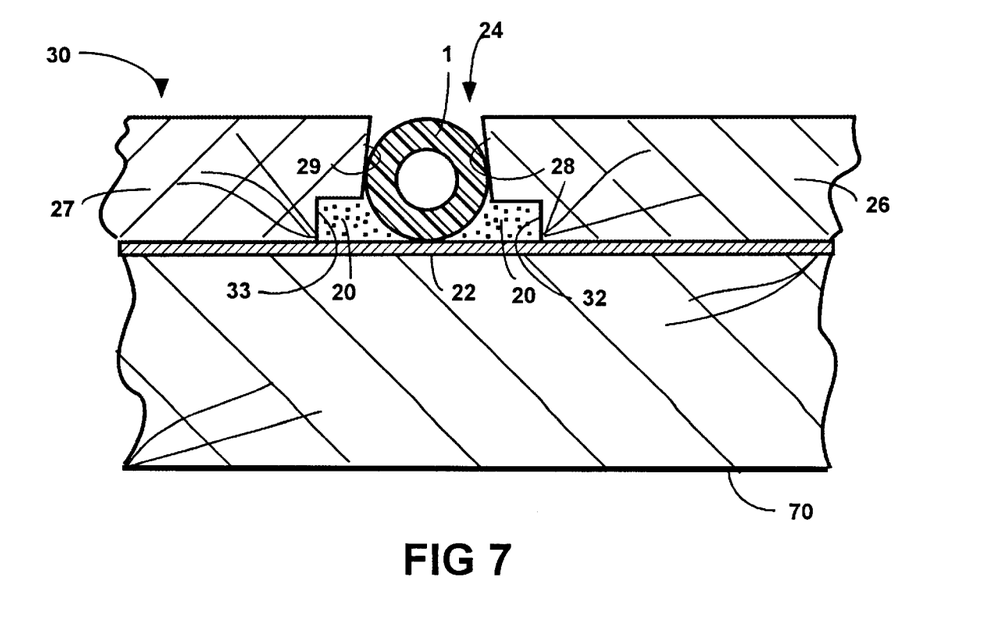
FIG. 7 shows the same modular piece as shown in FIG. 6 installed on top of the sub-floor with the filler material adhering the inserted tubing against the plate over a broad area thereof provided by the undercuts.

FIG. 7 shows the same modular piece 30 as shown in FIG. 6 installed on top of the sub-floor 70 with the filler material 20 adhering the inserted tubing 1 against the plate 22 over a broad area thereof provided by the undercuts.

The inside edges of the sleeper pieces 26 and 27 define the space 24 into which the tubing is inserted and held against the plate 22. Those edges 28 and 29 are preferably beveled slightly as shown in FIGS. 6 to 10 and provide a tight fit for the tubing. The purpose of the bevel of edges 28 and 29 is to taper the entrance walls to space 24 so that it becomes slightly wider toward the plate. Thus, the tubing must be forced into the space from the open side thereof and once forced into the space is held firmly therein against plate 22 even without the adhering filler material 20. The tubing is further held securely in space 24 in intimate thermal contact with the plate by the compliant thermally conductive filler material 20. According to the present invention the sleeper pieces 26 and 27 are undercut as shown by undercuts 32 and 33, respectively, and the spaces provided by the undercuts are filled with the filler material 20 and so the undercuts provide a greater thermal footprint of the tubing on the plate than heretofore.

Figure 8:
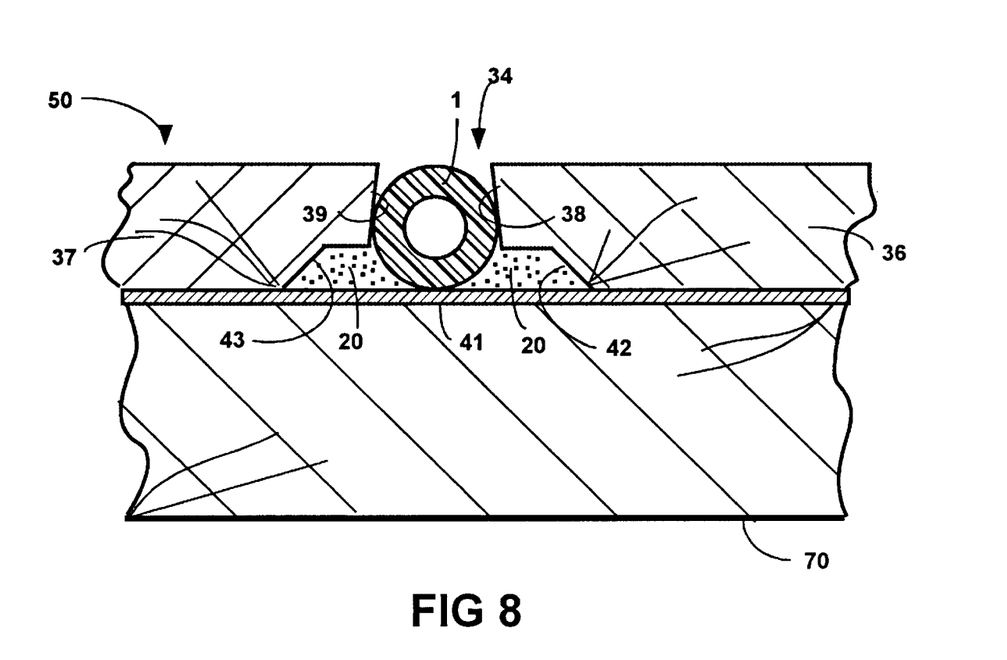
FIG. 8 shows a similar modular piece with undercuts that taper outward to increase thermal contact of the tubing with the plate even more.

FIG. 8 shows a similar modular piece 50 in which the tubing containment space 34 is the space between sleeper boards 36 and 37 and is closed on one side (the bottom side) by the plate 41 for top of the sub-floor installation and so the tubing 1 must be inserted into this space from the open side of the space (the top side). The filler material 20 adheres the inserted tubing 1 against the plate 41 over a broad area thereof provided by the tapered undercuts 42 and 43. These undercuts taper outward to increase thermal contact of the tubing with the plate even more than for modular piece 30.

Figure 9:
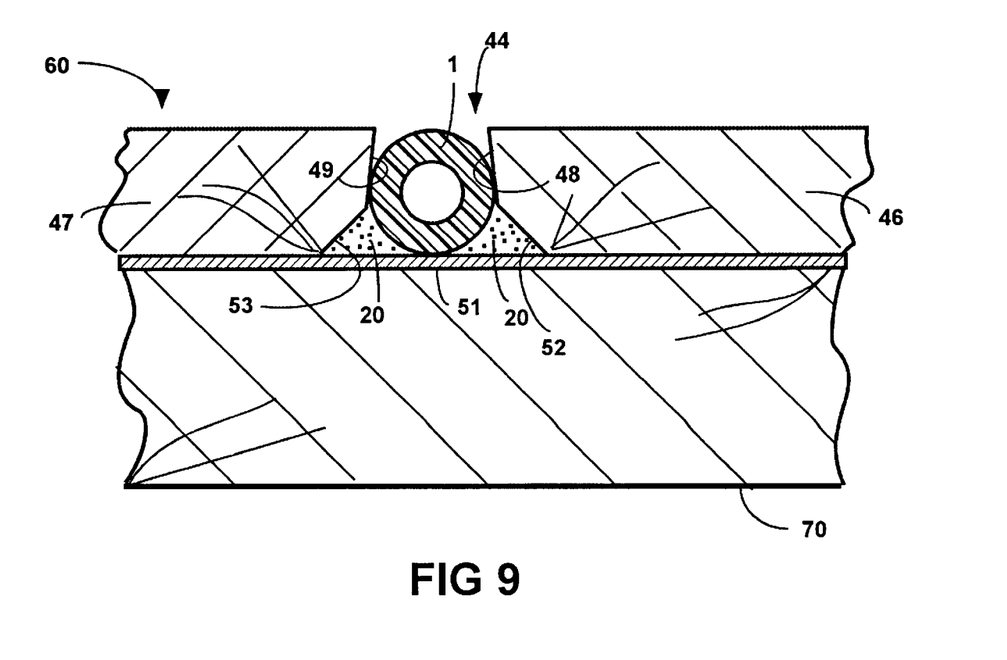
FIG. 9 shows another similar modular piece wherein the undercuts are beveled edges of the sleeper boards.

FIG. 9 shows another similar modular piece 60 in which the tubing containment space 44 is the space between sleeper pieces 46 and 47 and is closed on the bottom side by the plate 51 for top of the sub-floor installation and so the tubing 1 must be inserted into this space from the open side of the space (the top side). The filler material 20 adheres the inserted tubing 1 against the plate 51 over a broad area thereof provided by the tapered undercuts 52 and 53 which are provided by beveled edges of the sleeper boards 45 and 47.

Figure 13:
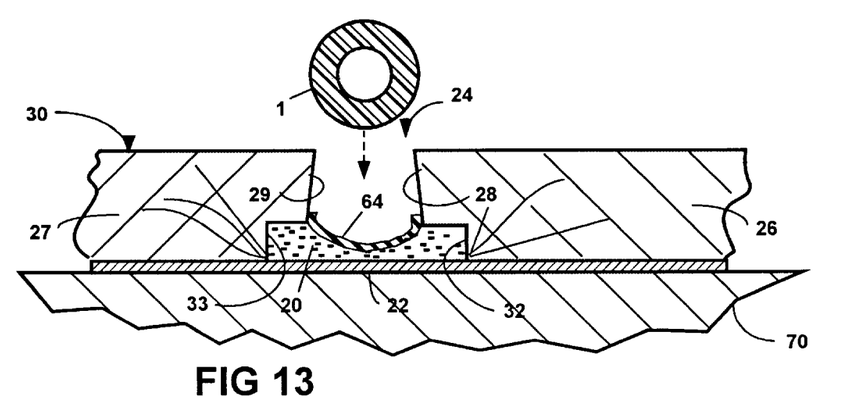
FIG. 13 is the same view as FIG. 7, wherein the compliant thermally conductive filler material, that may be silicone rubber, is included with the modular piece filling the undercuts in the holder and protected during storage by covering with a peel-off seal.

FIG. 13 shows the same modular piece 30 configuration of sleepers 26 and 27 and plate 22 with the tubing 1 removed from holding space 24 and poised for insertion into the space. The resilient filler material 20 can be inserted into the space just before the tubing is inserted, or it can be stored in the space and as such, be included with the modular piece as shown in FIG. 13. In either case it fully covers the part of the plate that provides the closed side of the space and so entirely fills the wider part of the space provided by the undercuts. Where the filler material 30 is stored, it is recommended that it be protected during storage by, for example covering it with a peel off seal, such as seal 64.

Installation of Tubing In Modular Piece

Figure 10:
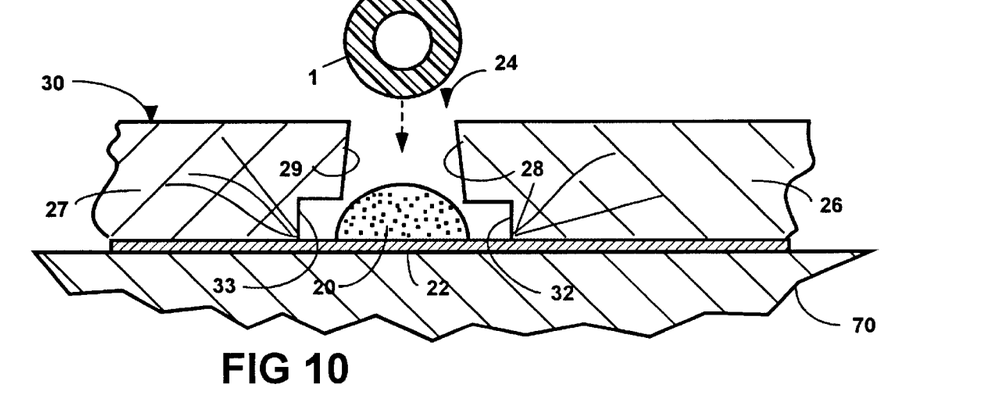
FIGS. 10 to 12 are much enlarged end views of the modular piece as installed on top of a floor and the steps of placing the compliant caulking in the tube containing space provided by the holder and then inserting the tubing into the space so that it is against the plate in intimate thermal contact over a broad area of the plate, provided by the compliant material that is forced into the undercuts in the holder adjacent the plate.
Figure 11:
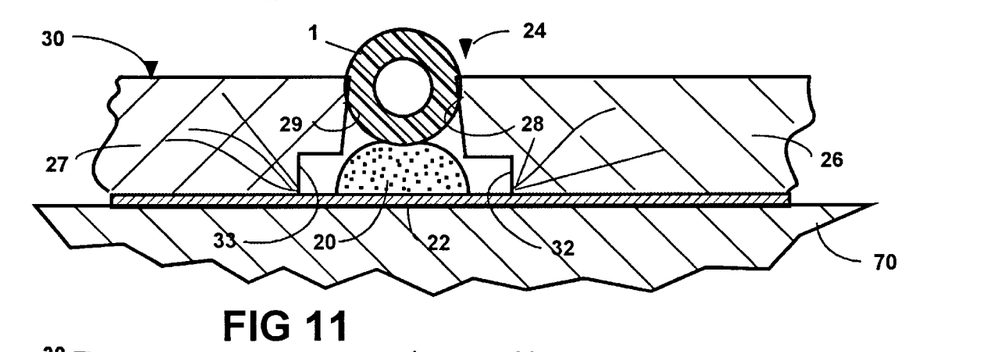
Figure 12:
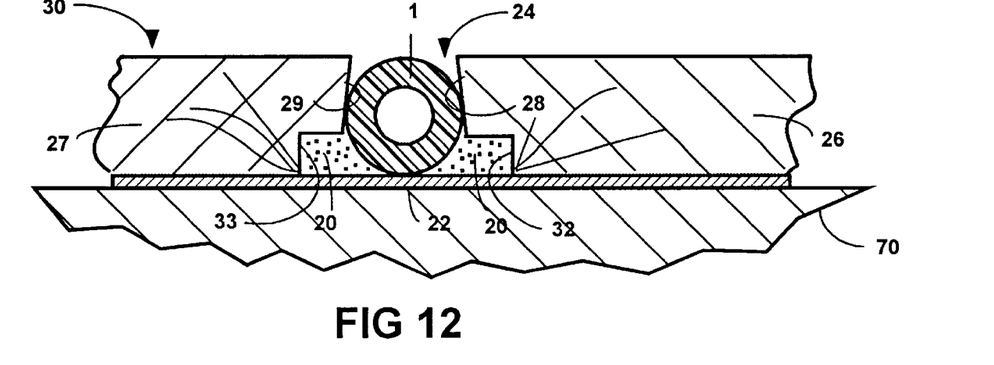

The steps of installing the module pieces and tubing on top or under the sub-floor for RFH or on a wall for RWH are shown by FIGS. 10 to 12. FIGS. 10 to 12 show the same modular piece 30 in which the tubing containment space 24 is the space between sleeper boards 26 and 27 and is closed on one side (the bottom side in these Figures) by the plate 22 and so the tubing 1 must by inserted into this space from the other side of the space (the top in these Figures). These Figures show end views of the modular piece as installed on top of a sub-floor and the steps of placing the compliant filler material in the tube containing space provided by the holder and then inserting the tubing into the space so that it is against the plate in intimate thermal contact over a broad area of the plate, provided by the compliant material that is forced into the undercuts 32 and 33 in the holder adjacent the plate.

FIG. 10 shows the module piece 30 with a bead of the compliant filler material 20 in space 24 on plate 22 (at the bottom of the space for above the sub-floor installation) and the tubing 1 poised for insertion into the space.

FIG. 11 shows the tubing partially inserted into the space and forcing the material 20 into wider part of the space provided by the undercuts 32 and 33.

FIG. 12 shows the tubing fully inserted into the space against the plate and forcing the material 20 to entirely fill the space between the tubing 1 and the plate 22.

Compliant Thermally Conductive Filler Material

The compliant filler material around the tubing held in the tubing holding space in any of the embodiments herein is applied to the space before the tubing is inserted or forced into the space. A purpose of the filler material is to hold the tubing in the space as an adhesive, while at the same time allowing the tubing to expand and contract longitudinally within the space of successive modular pieces that hold a length of tubing at installation. The tubing must be free to expand and contract, while the modular pieces are fixed by staples, nails, screws, etc. to the sub-floor or wall studs. Another purpose of the filler material is to reduce noise created by expansions and contractions of the tubing in the space. Yet another purpose is to provide a medium of thermal conduction from the tubing to the plate. A suitable filler material for any of these purposes is silicone rubber.

A convenient form of silicone rubber that can be used in the installations described herein is available commercially as a sealant or a caulking in viscous liquid form, usually dispensed from a tube by simply forcing it out of a nozzle on the tube. Such a sealant/caulking is usually a prepared mix of silicone dioxide, methanol and ammonia. A commercial source of this sealant/caulking mix is a General Electric product called SILICONE II that remains resilient for many years after it is applied.

RPH—Tubing on Top Of Sub-Floor

Figure 14:
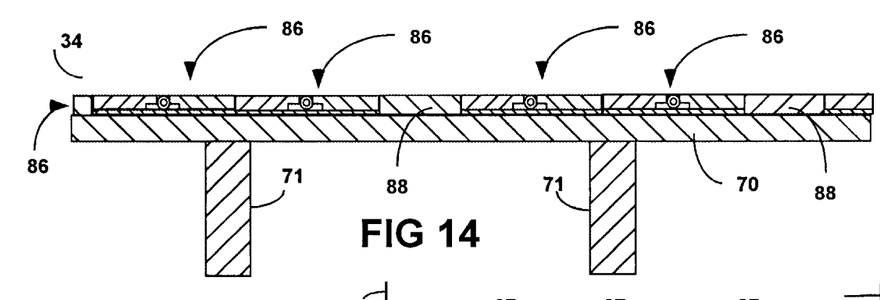
FIG. 14 is an end view of an RFH installation on top of the floor showing several of the modular pieces arranged side by side and with the tubing inserted according to the steps shown in FIGS. 10 to 12.

The tubing can be mounted on top of the sub-floor using modular pieces similar to any of the modular pieces 30, 50 or 60 shown in FIGS. 7 to 9. FIG. 14 is an end view of an RFH installation of the modular pieces 86 on top of the sub-floor 70, showing several modular pieces, each an assembly of two sleeper boards (the holder) and a heat transfer plate, the modular pieces being arranged side by side and end to end on the sub-flooring, on an area thereof in a room. Spacer boards 88 fill between the modular pieces to bring the surface of the installation even for the finished floor covering.

Figure 15:
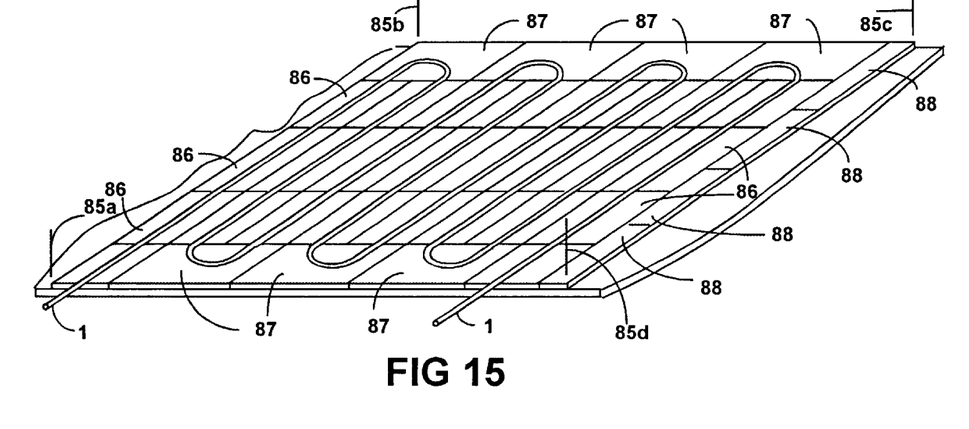
FIG. 15 is a perspective view of the floor of a room showing several of the modular pieces of different kinds, arranged side by side and end to end on top of the sub-floor of the room with the filler material and tubing installed according to FIGS. 10 to 12.

FIG. 15 is a perspective view of the same room showing several of the modular tubing holding pieces 86 and 87 of different kinds, arranged side by side and end to end on the sub-floor 70 of the room over an area of the floor defined by vertical corner lines 85a to 85c. The modular pieces hold tubing 1 as a continuous length laid down serpentine fashion from piece to piece, embedded in the holding spaces of the modular pieces and held securely therein by the space structure itself and the filler material 20 therein.

Figures 16, 17:
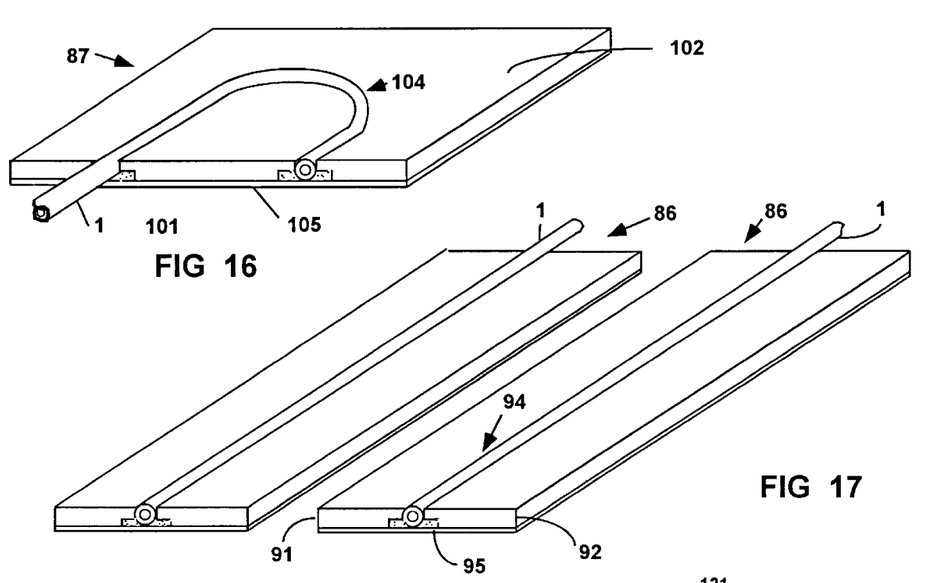
FIGS. 16 and 17 are perspective views of the several modular pieces of different kinds, that can be arranged as shown in FIG. 15.

FIGS. 16 and 17 are perspective views of the several modular pieces of different kinds, that can be arranged as shown in FIG. 15. The long modular pieces 86 in FIG. 15 for holding a straight length of the tubing 1 in holding space 94 are shown enlarged in FIG. 17. Here, each straight modular piece 86 is comprised of sleeper pieces 91 and 92, radiating plate 95 and holding space 94 which is undercut and contains the compliant thermally conductive lateral 20 adhering the tubing 1 to the plate.

Where the tubing turns at the end of a straight run on the floor, another type of modular piece 87 is used, the turn modular piece, in which the tubing holding space 104 for the tubing 1 turns 180 degrees, as shown in FIG. 16. Turn modular piece 87 is comprised of inside and outside sleeper pieces 101 and 102, radiating plate 105 and holding space 104 which is undercut and contains the compliant thermally conductive material 20 adhering the tubing 1 to the plate.

As shown in FIG. 15, for the on top of the sub-floor installation, the part of the sub-floor in the room that is not completely covered by a modular piece of one type or the other must be brought up to the level of the part that is covered, by pieces such as 88.

RWH-Tubing Horizontal Over Studs

Figure 18:
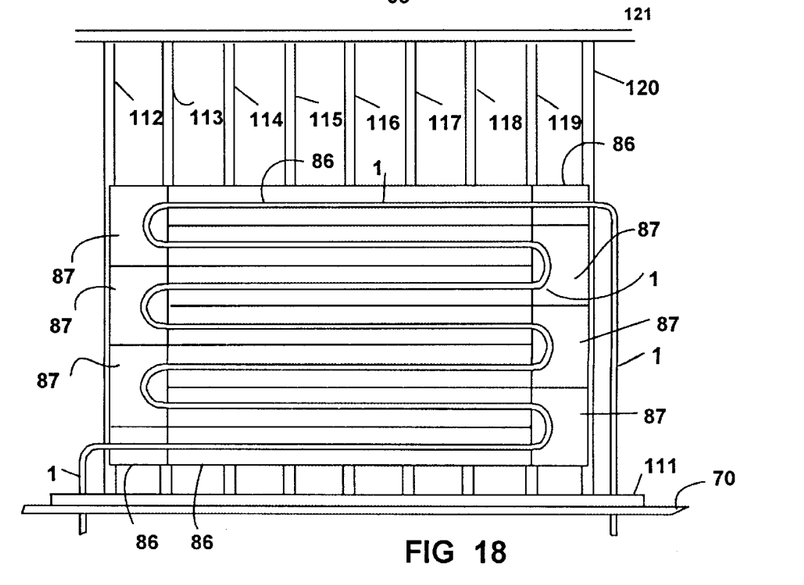
FIG. 18 is a front view of a RWH installation wall sole plate, studs and top plate with several of pieces of different kinds, such as shown in FIGS. 16 and 17, arranged side by side and end to end on the studs, providing a horizontal arrangement of several passes of the tubing across the studs and ready for covering by a finished wall covering.

A typical wood frame construction wall structure is shown in FIG. 18 and denoted 110. It includes a wall sole plate 111, studs 112 to 120 and top plate 121 with several of the straight run modular pieces 86 and 180 degree turn modular pieces 87 shown in FIGS. 16 and 17, arranged side by side and end to end on the studs, providing a horizontal arrangement of several passes of the tubing across the studs and ready for covering by a finished wall covering.

CONCLUSIONS

While the invention described herein is described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

I claim:

1. In a hydronic heating system including a heating element that is a length of tubing that conducts water mounted in a wall or a floor of an area heated by said system by RFH or RWH, respectively, in said area, against a highly thermally conductive plate having a radiating surface, a plate support of relatively low thermal conductivity material providing an elongated space for holding said length of tubing adjacent said plate, defined by first and second sides provided by said plate support, a third side provided by said plate and an open side, said tubing being inserted into said space through said open side thereof, a compliant filler of relatively higher thermal conductivity material fills around said tubing between said tubing and said plate throughout said space against said third side thereof provided by said plate, the improvement comprising, (a) at least one of said first and second sides provided by said plate support is undercut into said plate support along said plate so that said third side of said elongated space that is provided by said plate is substantially wider than said open side thereof and said undercut fills with said material providing a substantially greater thermal path from the tubing to said plate (b) whereby said plate is heated by conduction of heat from said tubing through said material in said space against said third side thereof provided by said plate and (c) said plate radiating surface radiates heat to said area.

2. A hydronic heating system as in claim 1 wherein:

(a) said plate has length, width and thickness and said length and width define said radiating surface of said plate and (b) said plate is mounted in said floor or wall oriented with said radiating surface thereof parallel to said floor or wall surface adjacent thereto.

3. A hydronic heating system as in claim 2 wherein:

(a) said plate support for holding said length of tubing adjacent said plate, holds said tubing on the opposite side of said plate from said adjacent floor or wall surface.

4. A hydronic heating system as in claim 3 wherein:

(a) said compliant filler material fills around said tubing between said tubing and said plate and between said tubing and said plate support in said undercut along the width of said third side of said space provided by said plate.

5. A hydronic heating system as in claim 4, wherein (a) said plate support includes two spaced apart plate support pieces, (b) said elongated space is the space between said two spaced apart plate support pieces, (c) said plate support pieces each have length, width and thickness and the edges thereof are said first and second sides of said elongated space each of which are undercut into said plate piece along said plate and said undercuts fill with said material.

6. A hydronic heating system as in claim 5 wherein:

(a) said two spaced apart plate support pieces lengths are substantially the same as said plate length.

7. A hydronic heating system as in claim 5 wherein:

(a) said two spaced apart plate support pieces thicknesses are substantially the same as the outer diameter of said tubing.

8. A hydronic heating system as in claim 5 wherein:

(a) said two spaced apart plate support pieces widths are less than half of said plate width.

9. A hydronic heating system as in claim 5 wherein:

(a) said elongated space first and second sides widths are substantially greater than said two spaced apart elongated plate support pieces thicknesses.

10. A hydronic heating system as in claim 1 wherein:

(a) said elongated space undercut defines a step that widens said space towards said plate.

11. A hydronic heating system as in claim 1 wherein:

(a) said elongated space undercut defines an abrupt taper that widens said space from said open side thereof towards said plate.

12. A hydronic heating system as in claim 1 wherein:

(a) said elongated space defines an abruptly tapered step that widens said space from said open side thereof towards said plate.

13. A hydronic heating system as in claim 5 wherein:

(a) said elongated space first and second sides are slightly tapered from said open side thereof toward said third side thereof provided by said plate to at least half said plate support pieces thickness, where said plate support pieces undercuts begin.

14. A hydronic heating system as in claim 13 wherein:
(a) said undercuts are steps in the edges of said two spaced apart support pieces.

15. A hydronic heating system as in claim 13 wherein:
(a) said undercuts are bevels along the edges of said two spaced apart support pieces.

16. A hydronic heating system as in claim 1 wherein:
(a) said compliant filler material is silicone rubber.

17. A hydronic heating system as in claim 1 wherein:
(a) said plate is metal.

18. A hydronic heating system as in claim 1 wherein:
(a) said plate support is wood.

19. A hydronic heating system as in claim 1 wherein:
(a) said plate material is aluminum,
(b) said compliant filler material is silicone rubber and
(c) said plate support is wood.

20. In a hydronic heating system including a heating element that is a length of tubing that conducts water mounted in a wall or a floor of an area heated by said system by RFH or RWH, respectively, in said area, against a highly thermally conductive plate that is held by a plate support that provides an elongated space for holding a length of said tubing adjacent said plate, said elongated space having an elongated open side for inserting said length of tubing into said space and being undercut into said plate support along said plate, the method of installing said heating loop including the steps of:
(a) attaching said modular units to said wall or floor of an area heated by said system by RFH or RWH with said elongated spaces thereof aligned end to end,
(b) inserting a compliant filler material into said elongated space and
(c) inserting said tubing into said space through said open side thereof,
(d) whereby said inserted compliant filler fills around said tubing between said tubing in said elongated space and said plate and into said undercut against said plate.

21. The method as in claim 20 wherein:
(a) said compliant filler material has relatively high thermal conductivity and provides intimate thermal conductivity between said tubing and said plate.

22. The method as in claim 20 wherein:
(a) said filler material is compliant and allows some movement of said tubing in said elongated space.

23. The method as in claim 22 wherein:
(a) said modular unit is rigid and dimensionally stable and said filler is compliant and distorts under force.

* * * * *